Patented June 6, 1944

2,350,391

UNITED STATES PATENT OFFICE 2,350,391

PRODUCTION OF MIXED ESTERS OF CELLULOSE

Henry Dreyfus, London, England, assignor to Celanese Corporation of America, a corporation of Delaware No Drawing. Application April 18, 1941, Serial No. 389,197. In Great Britain May 9, 1940

12 Claims. (Cl. 260—225)

This invention is concerned with improvements in the production of organic compounds and particularly in the production of mixed esters of cellulose containing both lower and higher aliphatic acid radicals.

The production of cellulose acetate is well known and can be carried out very satisfactorily by reacting cellulose with acetic anhydride using sulphuric acid as a catalyst, but when it is desired to introduce the radicle of a higher aliphatic acid, e. g., oleic, palmitic or stearic acid, into the cellulose molecule difficulties are encountered since the anhydrides of such acids are very much less reactive than acetic anhydride. It is, in general, a matter of considerable difficulty to introduce any substantial proportion of higher aliphatic acid radicle into the cellulose molecule without using conditions which are so vigorous that considerable degradation of the molecule takes place, with the result that the products obtained are of low viscosity and of little value for the production of filaments, foils and other articles having good tensile properties.

I have now discovered that the production of mixed esters of cellulose containing the radicle of acetic acid or other lower aliphatic acid containing less than six carbon atoms, for example propionic acid or butyric acid, and the radicle of a higher aliphatic acid containing at least six carbon atoms, for example, lauric, oleic, palmitic or stearic acid, can be effected satisfactorily by esterifying a lower aliphatic acid ester of cellulose with the anhydride of a higher aliphatic acid in a liquid medium using a metal halide, for example ferric or stannic chloride or, particularly, zinc chloride as catalyst, the liquid medium employed being a solvent for the catalyst and having at least a swelling action on the lower aliphatic acid ester. Preferably the liquid medium is one which is a solvent for the mixed ester produced so that at least in the later stages of the reaction the cellulose ester is in solution. If a hydrohalide acid is present as well as the metal halide, the esterification may be carried out at a lower temperature and/or for a shorter period of time than in the absence of the acid to obtain a product containing any particular content of higher aliphatic acid radicle.

The ester which is esterfied may be of low or medium viscosity, but is preferably of high or fairly high viscosity. For example, while a medium viscosity cellulose acetate, a 6% solution of which in acetone has a rate of flow of 15–20 compared with glycerol as 100, may be esterified, more valuable products are usually obtained from cellulose acetates of 50 or 100 viscosity or even more.

The proportion of metal halide and of hydrohalide acid (if employed) to cellulose ester may be about 0.1 to 1.5 or 2% and 0.1 to 1% respectively and the proportion of higher aliphatic acid anhydride may, e. g., be 50–100 or 150% depending to some extent on the amount of higher aliphatic acid radicle which it is desired to introduce. Preferably the liquid medium is present in a high proportion of the weight of the cellulose ester, e. g. 400 to 600% of its weight.

As indicated above, the catalyst which has been found particularly satisfactory for use in esterification with the higher aliphatic acid anhydride is zinc chloride and with such a catalyst a liquid medium consisting of a high proportion of a halogenated hydrocarbon, e. g. 90% of ethylene dichloride, and a low proportion, e. g. 10%, of acetone, has been found very suitable. Zinc chloride is used in quite a low proportion based on the weight of the lower aliphatic acid ester of cellulose. For example, at an esterification temperature of about 70 or 80° C. a proportion of catalyst of about .4–.6% may be employed while at a lower temperature, for example a temperature of 30 or 40° C., the proportion may be increased, for example to 1 or 1.5%. The actual proportion employed will, of course, also depend upon whether or not it is desired to complete the reaction in a short time and also upon the proportion of higher aliphatic acid radicle which it is desired to introduce.

As has been indicated above, the presence of a hydrohalide acid accelerates the esterification process and a proportion of about .5% of zinc chloride is sufficient at a temperature of 25 or 35° C., in the presence of about .5% of hydrochloric acid. In the presence of a hydrohalide acid the esterification temperature should not in general exceed 50° C. In its absence higher temperatures up to about 100° C. may be employed. The duration of the reaction may, for example, be 10, 30 or 60 hours or more dependent inter alia upon the proportion of catalyst employed and upon the proportion of higher aliphatic acid radicle which it is desired to introduce. On the completion of the reaction the ester, if in solution, may be precipitated by mixing the solution with a non-solvent, e. g. alcohol.

The following are examples of the production of mixed aliphatic acid esters of cellulose by the process of the present invention:

Example 1

120 parts by weight of palmitic anhydride and .5 part by weight of anhydrous zinc chloride are dissolved in about 500 parts by weight of a liquid medium consisting of 95% of ethylene dichloride and 5% of acetone. 100 parts by weight of powdered acetone-soluble cellulose acetate are then introduced, and the esterification mixture is heated and stirred for about 10–12 hours at a temperature of 70–80° C. At the end of this time a solution of the mixed ester is obtained and the ester is precipitated from the solution by the use of methylated spirit. It is then washed and dried.

Example 2

Cellulose acetate palmitate is produced in a similar manner to that described in Example 1 except that the esterification medium also contains about .25 part by weight of hydrogen chloride and esterification is carried out at 25–30° C. for about 40–60 hours.

Instead of precipitating the ester with spirit as described in the above examples it may be precipitated by mixing the solution with hot water, so as to drive off the ethylene dichloride in the form of vapor. The ester may then be purified by extraction with a liquid which is a solvent for the higher fatty acid formed during esterification.

The reaction described in each of the above examples yields a cellulose acetate-palmitate containing a substantial proportion of palmitic acid radicle and having a satisfactory viscosity. It can be used, for example, for the production of foils or films which have a much lower moisture regain than that of the articles when made from the acetone soluble cellulose acetate used as starting material.

Having described my invention, what I desire to secure by Letters Patent is:

1. Process for the production of mixed esters of cellulose, which comprises esterifying a cellulose ester of an aliphatic acid containing less than six carbon atoms with the anhydride of an aliphatic acid containing at least six carbon atoms using a liquid esterification medium which contains the anhydride and a dissolved metal halide catalyst and which has at least a swelling action on the cellulose ester employed as starting material.

2. Process for the production of mixed esters of cellulose, which comprises esterifying acetone-soluble cellulose acetate with the anhydride of an aliphatic acid containing at least six carbon atoms using a liquid esterification medium which contains the anhydride and a dissolved metal halide catalyst and which has at least a swelling action on the cellulose acetate employed as starting material.

3. Process for the production of mixed esters of cellulose, which comprises esterifying a cellulose ester of an aliphatic acid containing less than six carbon atoms at a temperature below 100° C. with the anhydride of an aliphatic acid containing at least twelve carbon atoms using a liquid esterification medium which contains the anhydride and up to 2%, based on the weight of the cellulose ester, of dissolved zinc chloride catalyst and which has at least a swelling action on the cellulose ester employed as starting material.

4. Process for the production of mixed esters of cellulose, which comprises esterifying a cellulose ester of an aliphatic acid containing less than six carbon atoms at a temperature below 100° C. with the anhydride of an aliphatic acid containing at least six carbon atoms using a liquid esterification medium which contains the anhydride and up to 2%, based on the weight of the cellulose ester, of a metal halide catalyst dissolved therein, the said medium containing a high proportion of a halogenated hydrocarbon and having at least a swelling action on the cellulose ester employed as starting material.

5. Process for the production of mixed esters of cellulose, which comprises esterifying a cellulose ester of an aliphatic acid containing less than six carbon atoms at a temperature below 100° C. with the anhydride of an aliphatic acid containing at least twelve carbon atoms using a liquid esterification medium which has at least a swelling action on the cellulose ester employed as starting material and which contains the anhydride and between 0.1 and 2% of metal halide catalyst, based on the weight of the cellulose ester used as starting material dissolved in a mixture consisting of 90–95% of ethylene dichloride and 10–5% of acetone.

6. Process for the production of mixed esters of cellulose, which comprises esterifying acetone-soluble cellulose acetate at a temperature below 100° C. with the anhydride of an aliphatic acid containing at least six carbon atoms using a liquid esterification medium which contains the anhydride and up to 2%, based on the weight of the cellulose ester, of zinc chloride catalyst in solution and which has at least a swelling action on the cellulose acetate employed as starting material.

7. Process for the production of mixed esters of cellulose, which comprises esterifying acetone-soluble cellulose acetate at a temperature below 100° C. with the anhydride of an aliphatic acid containing at least twelve carbon atoms using a liquid esterification medium which has at least a swelling action on the cellulose acetate employed as starting material and up to 2%, based on the weight of the cellulose ester, of which contains the anhydride and a metal halide catalyst dissolved in a mixture consisting of 90–95% of ethylene dichloride and 10–5% of acetone.

8. Process for the production of mixed esters of cellulose, which comprises esterifying acetone-soluble cellulose acetate at a temperature below 100° C. with the anhydride of an aliphatic acid containing at least six carbon atoms using a liquid esterification medium which contains ethylene dichloride, the anhydride and between 0.1 and 2%, based on the weight of the cellulose acetate used as starting material, of dissolved zinc chloride catalyst, and which has at least a swelling action on the cellulose ester employed as starting material.

9. Process for the production of mixed esters of cellulose, which comprises esterifying acetone-soluble cellulose acetate at a temperature below 50° C. with the anhydride of an aliphatic acid containing at least twelve carbon atoms using a liquid esterification medium which comprises ethylene dichloride and has at least a swelling action on the cellulose ester employed as starting material and which contains the anhydride, dissolved zinc chloride catalyst in a proportion of between 0.1 and 2% and a hydrohalide acid in a proportion of between 0.1 and 1%, both proportions being calculated on the weight of the cellulose acetate employed as starting material.

10. Process for the production of mixed esters of cellulose, which comprises esterifying acetone-soluble cellulose acetate at a temperature below 100° C. with the anhydride of an aliphatic acid containing at least twelve carbon atoms using a liquid esterification medium which has at least a swelling action on the cellulose acetate employed as starting material and which contains the anhydride and between 0.1 and 2% of dissolved zinc chloride catalyst based on the weight of the cellulose ester used as starting material.

11. Process for the production of mixed esters of cellulose, which comprises esterifying acetone-soluble cellulose acetate at a temperature below 50° C. with the anhydride of an aliphatic acid containing at least six carbon atoms using a liquid esterification medium which has at least a swelling action on the cellulose ester employed as starting material and which contains the anhydride, dissolved zinc chloride catalyst in a proportion of between 0.1 and 2% and a hydrohalide acid in a proportion of between 0.1 and 1% both proportions being calculated on the weight of the cellulose ester employed as starting material.

12. Process for the production of mixed esters of cellulose, which comprises esterifying a cellulose ester of an aliphatic acid containing less than six carbon atoms at a temperature below 50° C. with the anhydride of an aliphatic acid containing at least twelve carbon atoms using a solution, in a mixture consisting of 90–95% of ethylene dichloride and 10–5% of acetone, of the anhydride, zinc chloride catalyst in a proportion of between 0.1 and 2% and hydrochloric acid in a proportion of between 0.1 and 1%, both proportions being calculated on the weight of the cellulose ester employed as starting material, the esterification medium being employed in a proportion of 400–600% of the weight of the cellulose ester employed as starting material.

HENRY DREYFUS.

CERTIFICATE OF CORRECTION.

Patent No. 2,350,391.                                                                 June 6, 1944.

HENRY DREYFUS.

It is hereby certified that error appears in the printed specification of the above numbered patent requiring correction as follows: Page 2, second column, lines 41 to 43, inclusive, claim 7, for "and up to 2%, based on the weight of the cellulose ester, of which contains the anhydride and" read --and which contains the anhydride and up to 2%, based on the weight of the cellulose ester, of--; and that the said Letters Patent should be read with this correction therein that the same may conform to the record of the case in the Patent Office.

Signed and sealed this 15th day of August, A. D. 1944.

Leslie Frazer

(Seal)                                             Acting Commissioner of Patents.